Aug. 31, 1926.
W. J. DRUCKER
SLICING MACHINE
Filed Dec. 24, 1924  2 Sheets-Sheet 1
1,598,562
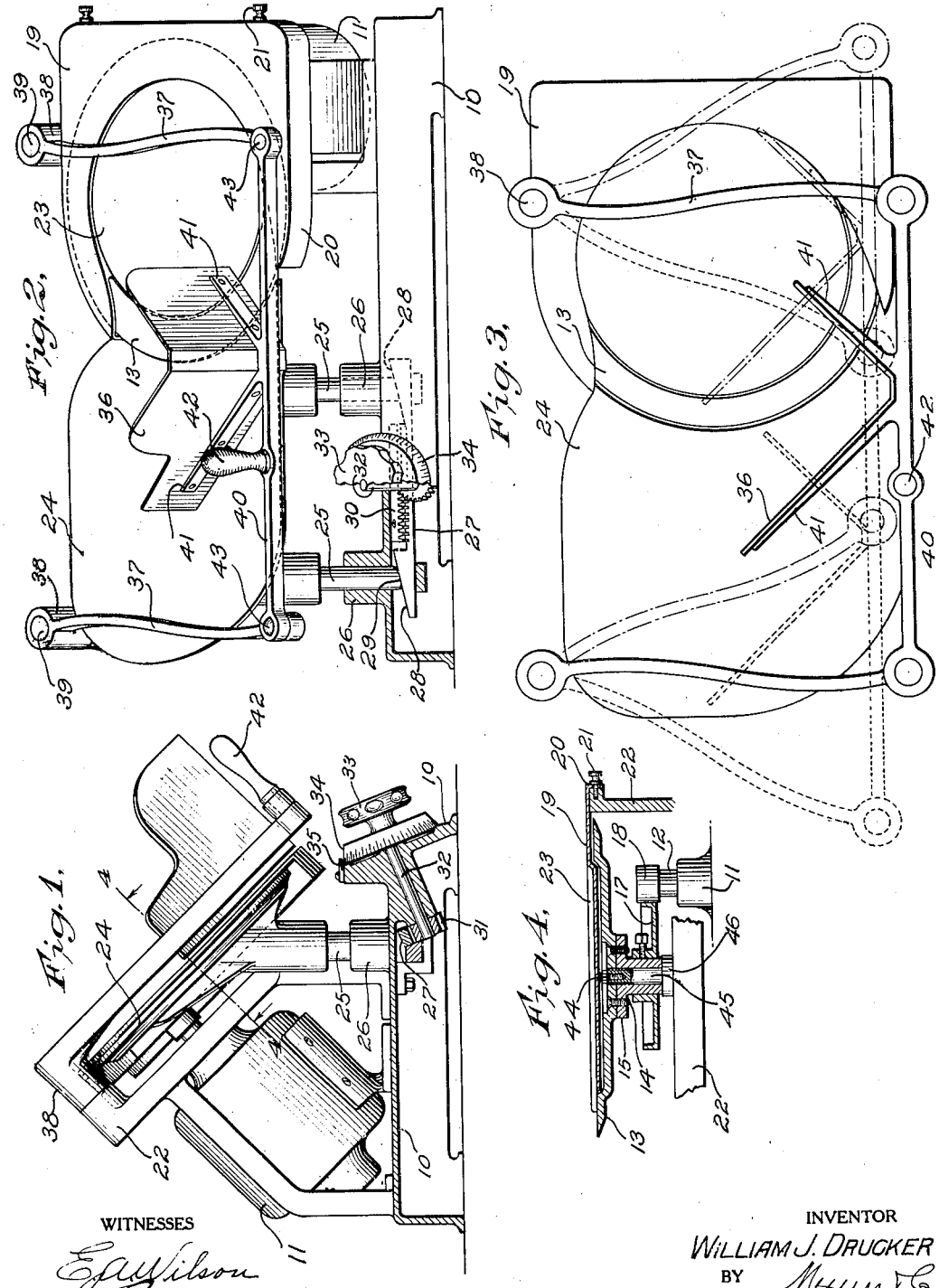
WITNESSES
INVENTOR
WILLIAM J. DRUCKER
BY
ATTORNEYS

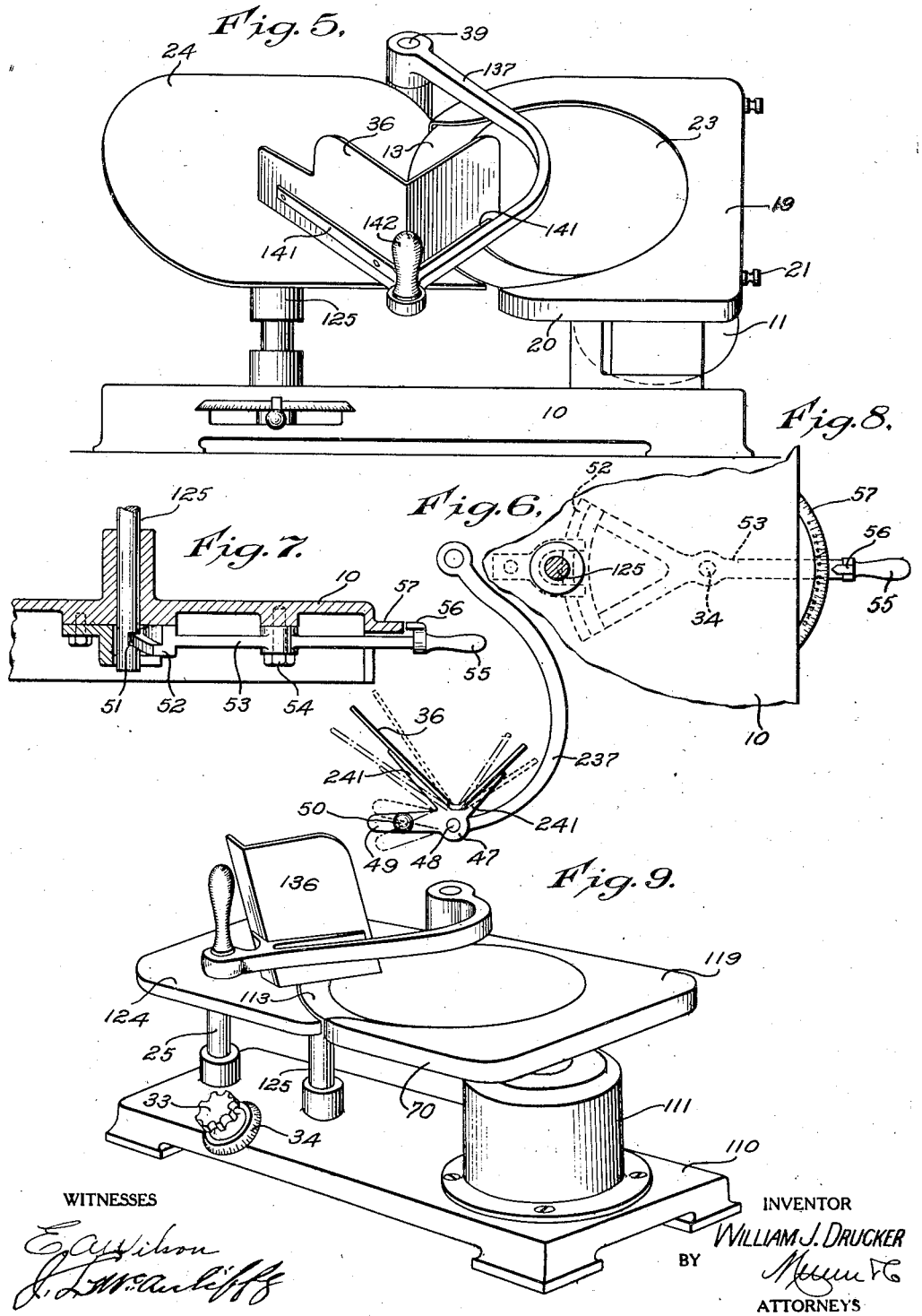

Patented Aug. 31, 1926.

1,598,562

UNITED STATES PATENT OFFICE.

WILLIAM J. DRUCKER, OF NEW YORK, N. Y.

SLICING MACHINE.

Application filed December 24, 1924. Serial No. 757,848.

My invention relates to a slicing machine and while more particularly intended for embodiment in a meat slicing machine the invention is capable of employment for slicing bread or other material.

The invention more particularly relates to a machine in which the meat or material to be sliced is repeatedly presented to a revolving disk knife.

The general object of my invention is to provide a slicing machine of the indicated type improved in various particulars especially with respect to the movement given the material to be sliced, and means for adjusting the table relatively to the plane of the knife.

The nature of my invention and its distinguishing features and advantages will clearly appear as the description proceeds.

Reference is to be had to the accompanying drawings forming a part of this specification, it being understood that the drawings are merely illustrative of practical examples of the invention.

Figure 1 represents partly in end elevation and partly in transverse vertical section, a meat slicing machine embodying my invention in its preferred form;

Figure 2 is a front elevation of a machine partly broken away and in section;

Figure 3 is a plan view largely diagrammatic given to show the movement imparted to the meat-holding means;

Figure 4 is a detail in section in a plane indicated by the line 4—4, Figure 1;

Figure 5 is a front elevation of a meat slicing machine embodying my invention in another form;

Figure 6 is a fragmentary plan view showing a modification of the means for holding and moving the meat or other material to be sliced;

Figure 7 is a detail in transverse vertical section showing the preferred means for raising and lowering the table;

Figure 8 is a sectional plan view of the table-raising means shown in Figure 7;

Figure 9 is a perspective view of a meat slicing machine embodying my invention adapted to a horizontal table as distinguished from the inclined tables in the forms shown in Figures 1 to 3 and in Figure 5.

In carrying out my invention in practice in accordance with the illustrated examples and referring at first more particularly to Figures 1 to 4, the machine embodies as usual a suitable base 10, mounted on which base 10 is a motor 11 here conventionally indicated as an electric motor the numeral 12 indicating the motor shaft. Any suitable knife and drive means therefor may be employed, there being shown in the illustrated example the usual disk knife 13 secured by screws 14 to the flange 15 on the knife shaft 16. To drive the knife shaft in the form illustrated, I have shown as one example of means a friction wheel 17, said wheel in driving engagement with a friction pinion or zone 18 on the motor shaft 12. The numeral 19 indicates a knife guard. On said knife guard 19 is shown a flange 20 secured by screws 21 to the frame 22, it being understood that any suitable form of frame may be employed. The guard furthermore includes a depressed central area 23 conforming to a corresponding depression in the knife 13 and at the inner side the top of the guard 19 and its flange 20 are cut away to afford clearance for presenting the meat or other material to the knife 13.

The table 24 of the slicing machine extends adjacent to the knife 13 and presents a concave edge at the side adjacent said knife 13. The table 24 in the form of the invention shown in Figures 1 to 4 is supported by two standards 25 which are capable of vertical movement in bosses 26 on the base 10. The table may be raised or lowered relatively to the plane of the knife 13. In Figures 1 and 2 a bar 27 is shown having inclined cam faces 28 at the upper side which engage a corresponding cam surface 29 on each of the standards 25. The bar 27 is formed with a rack 30, said rack being engaged by a toothed pinion 31 on the spindle 32 turning in base 10 and formed with a turning head 33 at the front of said base. Integral with the head 13 is a graduated disk 34 and on the base 10 and coacting with the graduated disk 34 is a pointer 35. By turning the head 33 of shaft 32, the pinion 31 will be turned and the rack 27 moved longitudinally so that by the coacting cam surfaces 28, 29, the table 24 may be raised or permitted to lower relatively to the plane of knife 13 for varying the thickness of the slice of meat, bread, or the like.

In my invention swingable means is provided to actuate the holder for the meat or other material, thereby facilitating and making more effective the operation of slicing.

In the form shown in Figures 1, 2 and 3 a meat holder 36 presents flaring sides at right angles or approximately so to each other and swingable means is provided arranged to impart movement to said meat holder. In the preferred form of my invention shown in Figure 1, 2 and 3, two swingable arms 37 are provided having hubs 38 fitting studs 39 on frame 22. The swingable arms 37 are connected by a bar 40 to which the holder 36 for meat or the like is secured. The connection between the meat holder 36 and the bar 40 is shown as consisting of two convergent bracket arms 41. On the bar 40 is a suitable handle 42 for moving said bar longitudinally and thereby causing the arms 37 to swing with the studs 39 as centers. Nothwithstanding the fact that the pivots 43 between the arms 37 and connecting bar 40, move in an arcuate path, the coupling of said arms 37 by the bar 40 and the mounting of the meat holder 36 on said bar gives said meat holder a parallel movement so that the angular position of the meat holder is not changed as said meat holder is carried to and from the knife.

A very important result of the described construction is that a compact assemblage is produced thereby. In machines in which the meat holder is given a direct rectilineal movement, the machine has an undesirable width for the moving parts and their guideways. The provision of swingable or oscillating arms (37) results in increased compactness in the assemblage and at the same time results in an effective movement of the meat holder or other material to the knife.

Reverting to the guard 19 the provision of the flange 20 enables me to place the securing screws 21 at an end of the machine below the top surface thereof instead of the customary method of passing the screws directly downward through the top of the guard. Again, respecting the guard 19 it will be observed from Figure 4 that a vertical screw 44 is provided in the reduced upper end 45 of knife shaft 16. Said screw 44 may be turned back and forth sufficient to maintain it in supporting contact with the under side of the depressed portion 23 of guard 19. The numeral 46 indicates a bearing in frame 22 for the knife shaft 16, it being understood that any suitable bearing arrangement may be provided in practice.

In the form of the invention shown in Figure 5 the table 24, knife 13 and guard 19 as well as the motor 11 are the same as in the first described construction. In Figure 5, however, a single standard 125 supports the table 24, instead of two standards 25 as in the first described construction. In the form shown in Figure 5 instead of two swingable or oscillating arms 37, a single arm 137 is employed, which is adapted to swing about the axis of the stud 39. Said single arm 137 is provided with a bracket 141 corresponding with the bracket 41, said bracket 141 having secured thereto the meat holder 36 as described in the first construction. A handle 142 is provided on the outer end of the arm 137 and is thus positioned adjacent the angle of the bracket arms 141 and the convergent walls of the meat holder 36. The first described construction is preferred, however, since the use of the single arm arrangement as in Figure 5 results in giving the meat holder 36 various angular positions. With the swinging of arm 137, said meat holder might be given a position where the meat would not be held against displacement.

In Figures 5, 6 and 7, I have shown a modified means for raising and lowering the standard 125 and with it the table 24. Said standard has a cam groove 51 and engaging in the said cam groove is an arcuate cam 52 on the end of a lever 53 fulcrumed between its ends as at 54 at the under side of base 10. Said lever has a handle 55 at the outer end and rigid with said lever is a handle 56 adapted to move over a graduated arcuate element 57 rigid with base 10. Thus, the turning of the lever 53 by grasping the handle 55 causes the cam 52 to raise or lower the standard 125.

In Figure 6 is a modification of the arm 137. In said Figure 6 the arm designated 237 is adapted to be turned about the stud 39 as in the previously described constructions. The meat holder 36 of the same form as in Figures 1 to 5 is secured to divergent arms 241 at right angles to each other, the same as the arms 41 and 141. Said arms 241 are integral with a bracket 47 adapted to turn about a vertical pivot pin 48 on the end of arm 237. Said bracket 48 has a lateral member 49 having a handle 50. The handle serves for swinging the arm 50 and at the same time permits the operator of the machine to turn the bracket 47 about the pivot pin 48 as a center so that with the swinging of the arm 237 the meat holder 26 may be turned about said pin 48 to maintain the meat holder in the same angular position notwithstanding the changing position of the arm 237.

In the form shown in Figure 9 the table 124 and knife 113 are disposed in a horizontal plane, the guard 119 corresponding in all respects with the guard 19 being also disposed horizontally. The standards 125 correspond with the standards 25 and are raised and lowered by the described adjusting means including head 33 and disk 34. The numeral 111 in Figure 9 indicates the electric motor and 110 the base.

In all forms of the machine, it is to be observed that the open side of the meat holder is disposed toward a plane passing through the pivots 39. Therefore, when a quick swinging movement is imparted to the arms 37, or the arm 137 or 237, as in slicing meat usually, the centrifugal force developed at the meat holder aids materially in holding the meat against the holder and without the employment of clamping means. Moreover, the whole structure of the holder and its supporting means, it will be seen, is held readily detachable from the pivots 39. Hence, the whole meat carrying and swinging structure may be quickly removed. A particular advantage of the quick removal of the complete meat-holding and swinging structure as a unit is that it permits of the ready removal thereof and the placing of a piece of bacon, for example, or other flat piece of meat on the table 24, so that the piece of bacon may be moved toward the knife 13 and the rind completely removed with a single movement, or a slice in a similar manner may be cut from a large flat piece of meat.

I would state furthermore that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. In a slicing machine, a knife, a holder for material to be sliced, and pivot means swingably carrying said holder, said holder presenting an open side disposed toward the plane of the pivot means of said swingable means, and said holder and holder-carrying means being removable as a unit from the pivot means.

2. In a slicing machine, a knife, a pair of arms pivoted to have swinging movement, connecting means between said arms remote from the pivot means, and a meat-holder mounted on said connecting means, said holder presenting an open side disposed toward a plane passing through the pivots of the arms.

3. In a slicing machine employing a table over which the material to be sliced may be moved, as well as a knife, adjacent the table, for slicing the material; means to raise and lower said table, said means comprising a movable element having a cam member engaging a part appurtenant to the table, in a manner to move said part.

4. In a slicing machine employing a slicing knife and a table over which the material to be sliced may be moved to present said material to the knife, a lever, and a cam on said lever, there being a part appurtenant to the table and engaged by said cam.

5. In a slicing machine employing a slicing knife, and a table over which the material to be sliced may be moved to present it to the knife, a cam member appurtenant to said table, a lever, and a cam on said lever engaging the first-mentioned cam.

6. In a slicing machine employing a slicing knife, and a table over which the material to be sliced may be moved to present it to the knife, a cam member appurtenant to said table, a lever, and a cam on said lever engaging the first-mentioned cam; together with coacting indicating means on said lever and on a fixed part of the slicing machine to indicate the extent of movement of the lever and its cam for producing slices of various thicknesses.

7. In a slicing machine employing a slicing knife, and a table over which the material to be sliced may be moved to present it to the knife, a cam member appurtenant to said table, a lever, and an arcuate cam on said lever engaging the first-mentioned cam; together with coacting indicating means on said lever and on a fixed part of the slicing machine to indicate the extent of movement of the lever and its cam for producing slices of various thicknesses.

8. In a slicing machine employing a slicing knife, and a table over which the material to be sliced may be moved to present it to the knife, a cam member appurtenant to said table, a lever, and an arcuate cam on said lever engaging the first-mentioned cam.

WILLIAM J. DRUCKER.